(12) United States Patent  
Rosen

(10) Patent No.: US 6,905,075 B1
(45) Date of Patent: Jun. 14, 2005

(54) PACKAGE WITH APERTURE THROUGH PRODUCT CODE

(75) Inventor: Ian K. Rosen, North Muskegon, MI (US)

(73) Assignee: AGS I-Prop, LLC, Muskegon, MI (US)

( * ) Notice: Subject to any disclaimer, the term of this patent is extended or adjusted under 35 U.S.C. 154(b) by 0 days.

(21) Appl. No.: 10/709,909

(22) Filed: Jun. 4, 2004

Related U.S. Application Data

(60) Provisional application No. 60/482,680, filed on Jun. 26, 2003.

(51) Int. Cl.[7] .............................................. G06K 19/06
(52) U.S. Cl. ...................................... 235/494; 235/487
(58) Field of Search ............................... 235/487, 489, 235/494

(56) References Cited

U.S. PATENT DOCUMENTS

| | | | |
|---|---|---|---|
| 5,161,687 A | 11/1992 | Kornell et al. | 206/447 |
| 5,423,139 A * | 6/1995 | Feldman | 40/673 |
| 5,740,066 A | 4/1998 | Suppelsa et al. | 364/489 |
| 5,927,495 A | 7/1999 | Didiano, Jr. | 206/459.5 |
| 6,177,683 B1 | 1/2001 | Kolesar et al. | 250/566 |
| 6,182,821 B1 | 2/2001 | Olsen | 206/160 |
| 6,196,593 B1 | 3/2001 | Petrick et al. | 283/81 |
| 2003/0004889 A1 * | 1/2003 | Fiala et al. | 705/64 |

OTHER PUBLICATIONS

Roger C. Palmer "The Bar Code Book" 1995 Third Edition, Helmers Publishing, pp. 15–29, 159–165.*

* cited by examiner

*Primary Examiner*—Mark Tremblay
(74) *Attorney, Agent, or Firm*—Van Dyke, Gardner, Linn & Burkhar, LLP

(57) ABSTRACT

A package for a retail item includes a panel having a front side and a back side, and an enclosure attached to the panel. The enclosure encloses a retail item of the package. The package includes a product identification code or price code or bar code printed on either the front side or the back side of the panel. An aperture is defined in the panel and passes through the product identification code. The aperture is adapted to receive a hook for hanging the package. The product identification code may be adapted to be read by a machine at a checkout counter. The product identification code thus may provide information to the machine that enables the machine to determine the price of the retail item.

25 Claims, 3 Drawing Sheets

PACKAGE WITH APERTURE THROUGH PRODUCT CODE

CROSS REFERENCE TO RELATED APPLICATIONS

The present application claims benefit of U.S. provisional application Ser. No. 60/482,680, filed Jun. 26, 2003, which is hereby incorporated herein by reference in its entirety.

FIELD OF THE INVENTION

The present invention relates generally to product packaging and, more particularly, to retail packaging that involves the use of bar codes on the packaging and that is hung up on pegboard extension hooks or other hook protrusions.

BACKGROUND OF THE INVENTION

The use of bar codes on retail products has become almost universal. Such bar codes are read by checkout scanners which correlate the code that is detected by the scanner with price and product information. This has greatly expedited the checkout process at retail stores. However, checkout clerks may still spend an undesirable amount of time searching for the bar code on a given retail item so that it can be scanned. This slows down the checkout process, which decreases efficiency and often times displeases customers.

The use of bar code labels on retail products has also suffered from other disadvantages in the past. In many instances, the manufacturer of the retail item wishes to utilize as much available space on the packaging for providing graphics, printed information, pictures, and other visual material that is meant to be viewed by the consumer. The manufacturer of the product, however, has been forced in the past to set aside a certain amount of space on the packaging for the printing of the bar code. The bar code thus reduces the amount of space that the manufacturer of the product has available for printing other information or pictures.

The desire can therefore be seen for product packaging that sacrifices less space to bar codes, reduces the time checkout clerks must spend looking for the bar codes, and provides more space for the manufacturer of the product to place other graphical information.

SUMMARY OF INVENTION

The present invention provides a package and method for packaging that reduces some of the aforementioned difficulties. The package and method of the present invention provides a hanging hole or aperture through the price or product code printed or otherwise formed on the package, so that the product identification code can be readily found by a person at a checkout counter or the like.

According to one aspect of the invention, a hang-up package for retail items is provided. The package includes a panel having a front side and a back side. An enclosure is attached to the panel and encloses the retail item. A bar code is printed on the front side of the panel and an aperture is defined in the panel in a location that passes through the bar code. The aperture is adapted to receive a hook for hanging the package.

According to other aspects of the present invention, the bar code is adapted to be read by a machine at a checkout counter and to provide information to the machine that enables the machine to determine the price of the retail item. The bar code may be a universal product code. The panel may be made out of cardboard and the enclosure may be made out of plastic. The aperture may be circular or non-circular. The panel may include information about the retail item printed thereon in a location outside of the bar code. The retail item may be a flowable material that is housed within the enclosure, or any other item that may be positioned within the enclosure. The enclosure may be a pouch, a plastic bubble, a shrink-wrap cover, or any other type of material that can be used to define a space for a product. The aperture in the panel may have a height that is less than one half of the height of the bar code. The aperture may also be positioned generally midway between each end of the bar code.

The retail package of the present invention positions the bar code in a location that heretofore has never been used for placement of a bar code. Specifically, the bar code is placed around the aperture defined in the package which receives a hook for hanging the package on the hook. The aperture is preferably sized such that it does not interfere with the reading of the bar code to the extent that automatic scanners can no longer read the bar code. Because bar codes have never been placed around such apertures in the past, this allows the bar code to be shifted to this new location, thereby freeing up other space on the package for providing printed information and the like. The store checkout clerk also has a reference point in locating the UPC markings at the top portion of the package without searching. This formerly "useless" graphic space now becomes useful when removed from the hang-up hook and presented to the checkout. Still further, because the area surrounding the hook hole typically did not include written information in the past, the positioning of the bar code around this hook hole allows for more efficient utilization of the space on the package for printed matter.

These and other objects, advantages, purposes, features and benefits of the present invention will be apparent to one skilled in the art upon a review of the following specification and the accompanying drawings.

DETAILED DESCRIPTION

Figure 2:
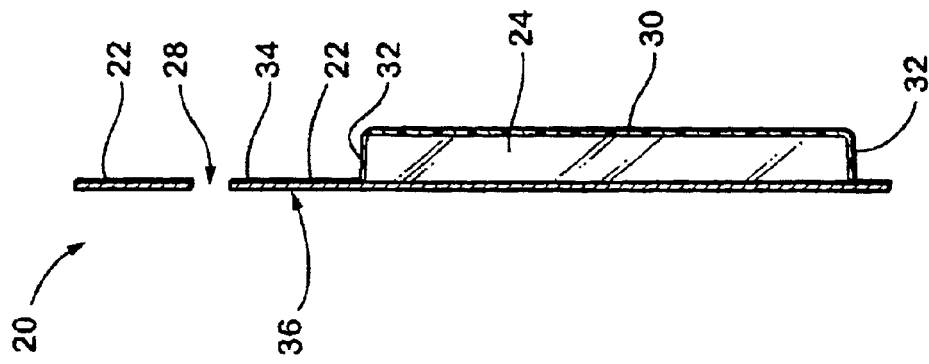
FIG. 2 is a sectional view of the package of FIG. 1 taken along the line II—II.
Figure 1:
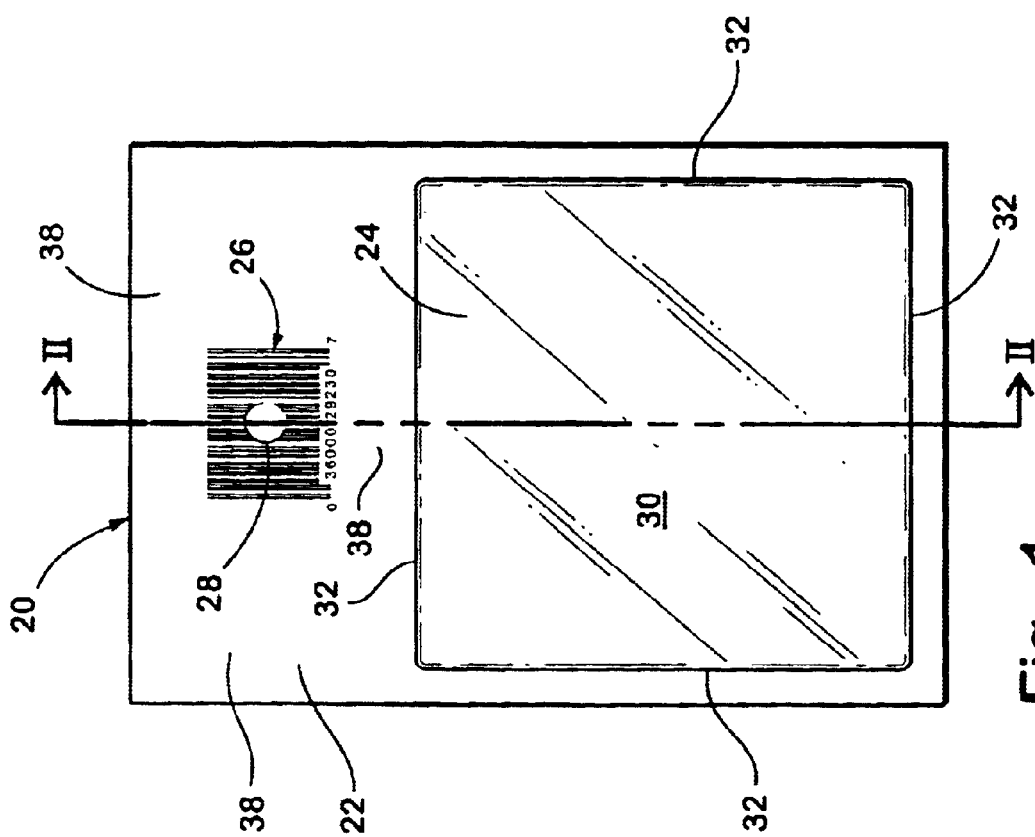
FIG. 1 is a plan view of a package according to the present invention.
Figure 4:
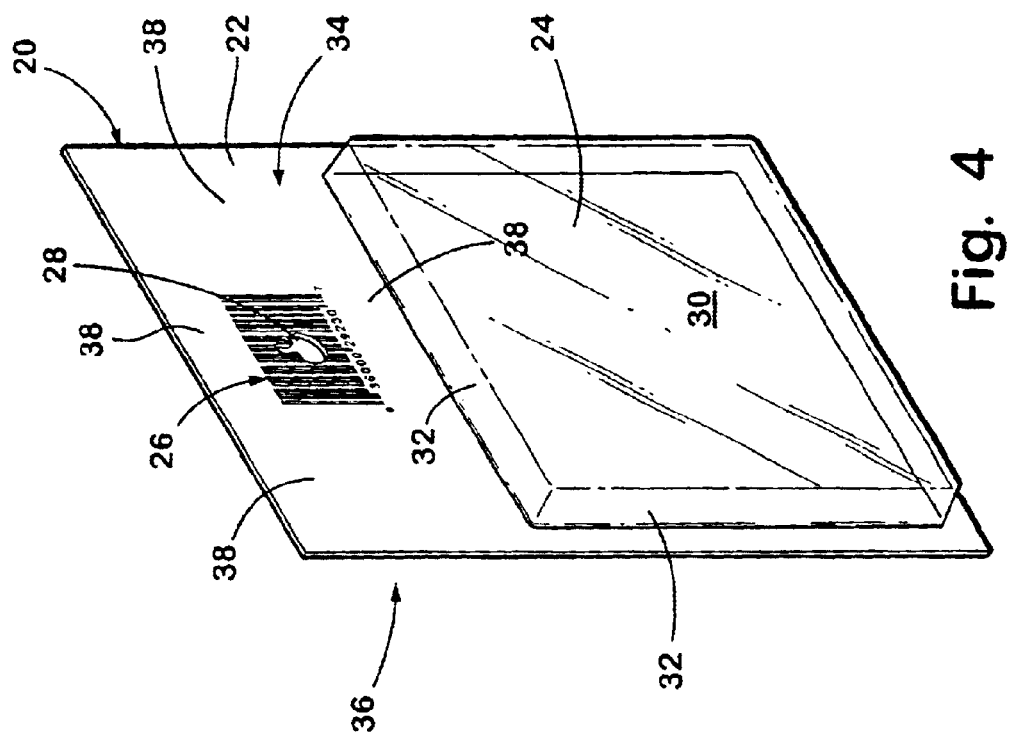
FIG. 4 is a perspective view of a package of the present invention.

The present invention will now be described with reference to the accompanying drawings wherein the reference numerals appearing in the following written description correspond to like numbered elements in the several drawings. A package 20 according to one aspect of the present invention is depicted in FIG. 1. Package 20 includes a panel 22, an enclosure 24 which may house a retail item, and a bar code 26 printed on the front side of the panel 22. An aperture 28 is defined generally or substantially at the center of bar code 26. Aperture 28 is provided to receive a hook, peg, or other structure on which package 20 may be hung. Enclosure 24, which is depicted in more detail in FIG. 4, may include a front wall 30 and a peripheral wall 32. Front wall 30 and peripheral wall 32 may be made out of plastic, although other materials may be used. These walls may be secured to panel 22 via an adhesive, or any other suitable bonding material or attaching material or method. Peripheral wall 32, front wall 30, and panel 22 define enclosure 24. Enclosure 24 houses a retail item, which may be any retail item, although package 20 is suitably constructed for housing relatively small retail items that may be hung on hooks in retail environments.

Panel 22 may be made out of a paper material, such as cardboard, although other materials may be used. Panel 22 includes a front side 34 and a back side 36. Front side 34 may be a glossy side that allows more visually appealing information to be printed thereon. By positioning bar code 26 right over aperture 28, bar code 26 is positioned in a standard location which checkout clerks can recognize and easily orient the package for scanning. Still further, by placing bar code 26 over aperture 28, peripheral areas 38 on front side 34 that surround aperture 28 can be utilized for printing graphical material. This graphical material may include pictures, words, or a combination thereof. This allows the more desirable peripheral areas 38 to be used for conveying information to the consumer, while leaving the less desirable area around aperture 28 for the functional bar code 26, which has no appeal to consumers.

Bar code 26 is preferably sized relative to aperture 28 such that aperture 28 will not interfere with the reading by a scanner of bar code 26. While other dimensions of bar code 26 relative to aperture 28 may be used, aperture 28 may desirably have a diameter that is less than one half of the height of bar code 26. Aperture 28 may also be placed generally midway between the ends of bar code 26. Other positions of aperture 28, however, can also be utilized. Preferably, the aperture is positioned within the body portion or between the borders of the bar code so that the aperture does not interfere with or intersect or touch the edges of the bar code and does not interfere with the numbers and/or letters that are typically present along the lower edge of the bar code (as can be seen in FIGS. 1 and 3–6). The aperture is thus within the body of the bar code and avoids the outer regions or edges of the bar code, which is where the reading or scanning may often or typically take place. Although shown as being positioned at the front face of the header portion or card of the container, the bar code may be printed or otherwise formed at the rear face or back of the container, without affecting the scope of the present invention.

Figure 3:
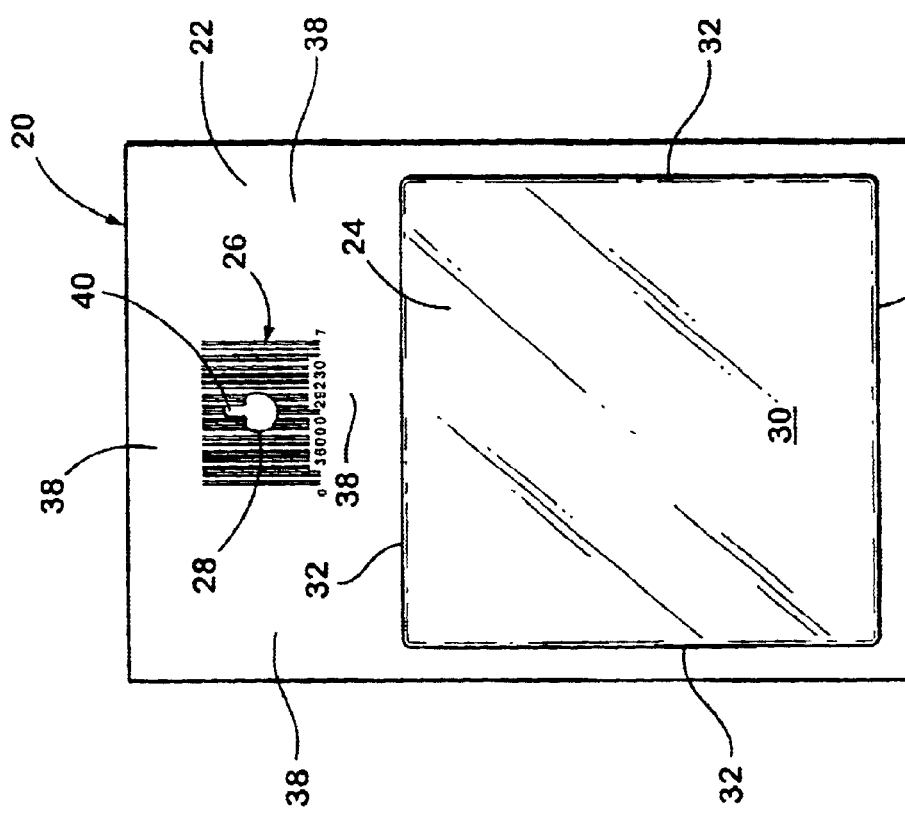
FIG. 3 is a plan view of a package according to a second embodiment of the present invention.

While aperture 28 may be defined as circular, it may also be defined in other shapes. For example, and as shown in FIG. 3, an aperture 28' may have a narrower top portion 40. Narrower top portion 40 in aperture 28' helps to center aperture 28' on the hook, peg, or other structure that is inserted through aperture 28'. The aperture may still take on other shapes other than those illustrated in FIGS. 1 and 3, without affecting the scope of the present invention. Still further, the bar code and the aperture may be positioned at other locations on the panel, without affecting the scope of the present invention.

Figure 6:
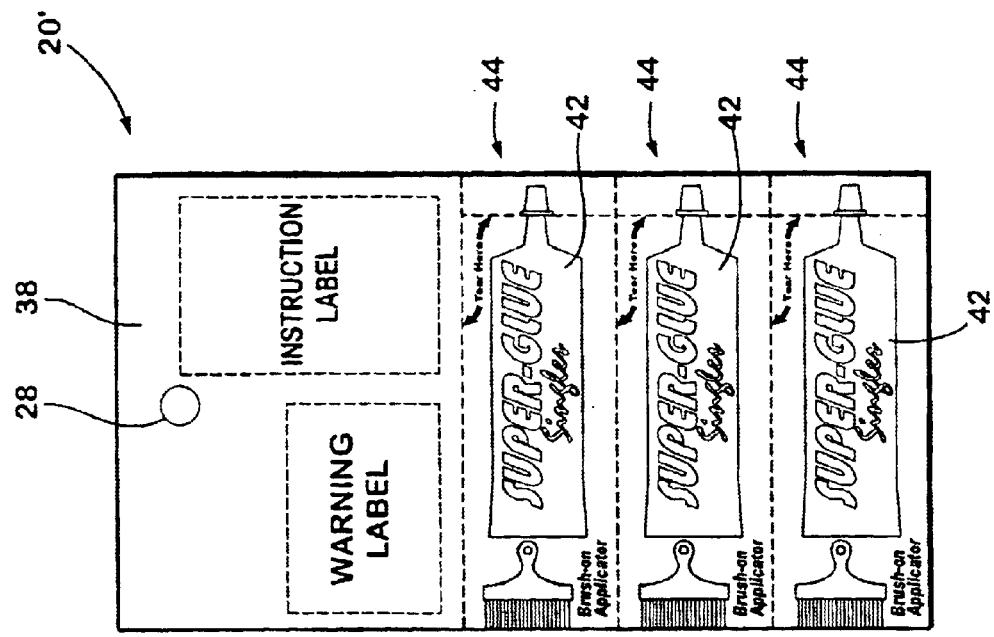
FIG. 6 is a plan view of the back side of the package of FIG. 5.
Figure 5:
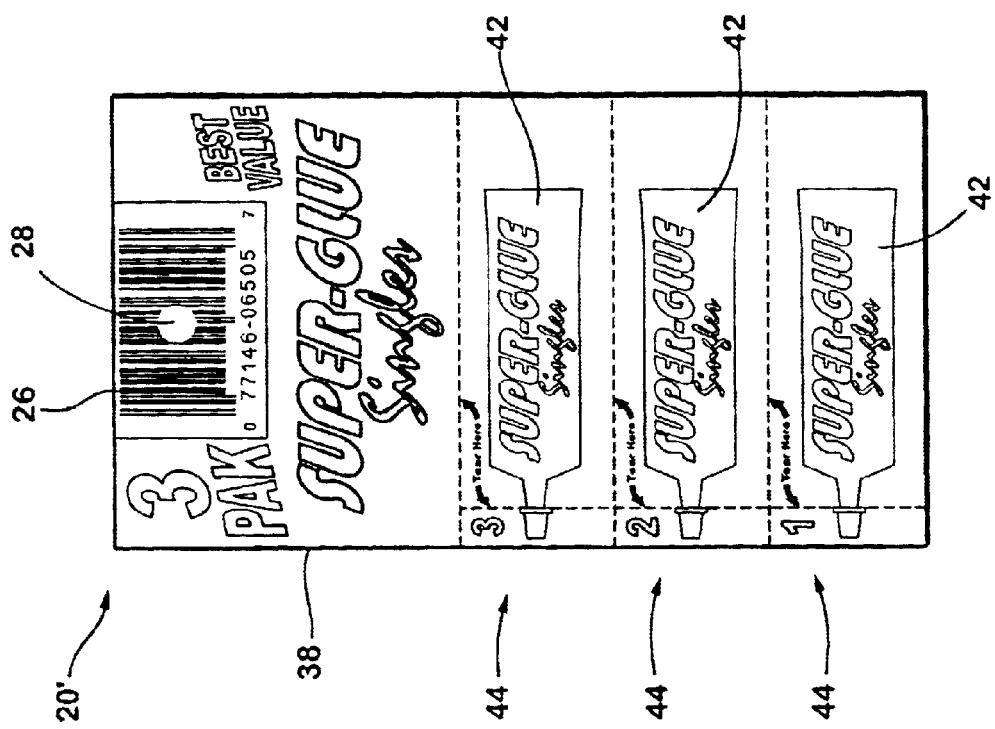
FIG. 5 is a plan view of a package according to another embodiment of the present invention.

FIGS. 5 and 6 depict another package 20' according to another embodiment of the present invention. Package 20' differs from package 20 in that the enclosure is not defined by any peripheral walls. Rather, package 20' is comprised of two sheets of material, such as foil, that are secured together about their borders. This sealing together of these materials about their borders defines cavities 42 between the two sheets of materials. These cavities may house a fluid, such as an adhesive or other flowable material. The cavities 42 are thus defined in a manner comparable to conventional ketchup packets. The cavities 42 may also be defined in any of the manners disclosed in U.S. patent application Ser. No. 10/818,775, filed Apr. 6, 2004 by Rosen et al. for CONTAINER FOR FLOWABLE PRODUCTS, the disclosure of which is hereby incorporated herein by reference.

In the illustrated embodiment of FIGS. 5 and 6, there are three cavities 42 in package 20'. Each cavity 42 is part of a segment 44 of package 20' that may be separately detached from package 20'. The segments may be defined by score lines that facilitate removal of one segment from another. Package 20' could be altered to have a single cavity 42, or a different number of cavities than that illustrated in FIGS. 5 and 6. Package 20' includes an aperture 28 that passes through a bar code 26. A plurality of graphical material can be seen printed in the peripheral areas 38 surrounding bar code 26. As an alternative to the two sheets of material that are sealed together to define cavities 42, a single sheet of material could be used that is folded over onto itself and sealed around the non-folded borders to define one or more cavities 42.

Optionally, in another embodiment, the package may include no enclosure, without affecting the scope of the present invention. Instead, the retail item may be attached to the panel by a physical structure, such as staples, adhesive tape, other adhesives, ties or some other type of fastener or the like. In this manner, the retail item can be coupled to the panel without the need for defining an enclosure.

Therefore, the present invention provides a hanging product or package or container that positions the hanging aperture through the product identification code or bar code that is printed or otherwise formed at the header portion of the container or card. The bar code thus is in a location where it may be readily found and scanned at a checkout counter or the like. The aperture and bar code may be positioned at or near or along an upper edge portion of the container and thus may leave the other areas of the header portion and/or container available for printing other information or indicia thereon.

While the present invention has been described in terms of the embodiments depicted herein and discussed above, it will be understood that the present invention is not limited to these particular embodiments, but includes any and all such modifications that are within the spirit and scope of the present invention as defined in the appended claims.

What is claimed is:

1. A package for a retail item comprising:
   a panel having a front side and a back side;
   an enclosure attached to said panel, said enclosure enclosing the retail item;
   a bar code printed on either the front side or the back side of said panel; and
   an aperture defined in said panel and passing through said bar code, said aperture adapted to receive a hook for hanging the package.

2. The package of claim 1, wherein said bar code is adapted to be read by a machine at a checkout counter, said bar code providing information to the machine that enables the machine to determine the price of the retail item.

3. The package of claim 1, wherein said bar code is a Universal Product Code.

4. The package of claim 1, wherein said panel is made out of cardboard.

5. The package of claim 1, wherein said enclosure is made of plastic and said enclosure completely surrounds the retail item.

6. The package of claim 1, wherein said aperture is circular.

7. The package of claim 1, wherein said aperture is non-circular and includes a top end that is narrower than a bottom end.

8. The package of claim 1, wherein said bar code is printed on the front side of said panel and said front side of said panel includes information about the retail item printed thereon in a location outside of said bar code.

9. The package of claim 1, wherein said retail item is a flowable material and said enclosure houses said flowable material.

10. The package of claim 1, wherein said aperture has a height that is less than one half of the height of said bar code.

11. The package of claim 1, wherein said aperture is defined between the ends of said bar code.

12. The package of claim 1, wherein said aperture is defined generally midway between the ends of said bar code.

13. The package of claim 1, wherein said aperture is defined adjacent to a top of said panel.

14. The package of claim 1, wherein said bar code provides price information for said retail item and a product number for said retail item.

15. A package for a retail item comprising:
   a panel having a front side and a back side;
   a retail item attached to said panel;
   a bar code printed on either the front side or the back side of said panel; and
   an aperture defined in said panel and passing through said bar code, said aperture adapted to receive a hook for hanging the package.

16. The package of claim 15, wherein said bar code is adapted to be read by a machine at a checkout counter, said bar code providing information to the machine that enables the machine to determine the price of the retail item.

17. The package of claim 16, wherein said bar code is a Universal Product Code.

18. The package of claim 17, wherein said panel is made out of cardboard.

19. The package of claim 15, wherein said aperture is circular.

20. The package of claim 15, wherein said aperture is non-circular and includes a top end that is narrower than a bottom end.

21. The package of claim 15, wherein said bar code is printed on the front side of said panel and said front side of said panel includes information about the retail item printed thereon in a location outside of said bar code.

22. The package of claim 15, wherein said aperture is defined adjacent a top of the panel.

23. The package of claim 15, wherein said bar code provides price information for said retail item and a product number for said retail item.

24. The package of claim 15, wherein said retail item is attached to said panel by way of a fastener selected from the group consisting of staples, tapes, adhesives, and ties.

25. The package of claim 15, wherein said aperture is defined between the ends of said bar code.

* * * * *